(12) United States Patent
Yoo et al.

(10) Patent No.: US 12,536,768 B2
(45) Date of Patent: Jan. 27, 2026

(54) ANOMALY DETECTION DEVICE AND METHOD USING NEURAL NETWORK, AND DEVICE AND METHOD FOR TRAINING NEURAL NETWORK

(71) Applicant: EL ROI LAB INC., Seoul (KR)

(72) Inventors: Kwangsun Yoo, Incheon (KR); Jungi Lee, Seoul (KR)

(73) Assignee: EL ROI LAB INC., Seoul (KR)

( * ) Notice: Subject to any disclaimer, the term of this patent is extended or adjusted under 35 U.S.C. 154(b) by 0 days.

(21) Appl. No.: 18/943,964

(22) Filed: Nov. 12, 2024

(65) Prior Publication Data

US 2025/0069361 A1 Feb. 27, 2025

Related U.S. Application Data

(63) Continuation of application No. PCT/KR2023/010697, filed on Jul. 25, 2023.

(30) Foreign Application Priority Data

May 26, 2022 (KR) .......................... 10-2022-0064978
Oct. 5, 2022 (KR) .......................... 10-2022-0126942

(51) Int. Cl.
*G06V 10/44* (2022.01)
*G06T 7/11* (2017.01)
*G06V 10/42* (2022.01)

(52) U.S. Cl.
CPC ................ *G06V 10/44* (2022.01); *G06T 7/11* (2017.01); *G06V 10/42* (2022.01); *G06T 2207/10036* (2013.01); *G06T 2207/20084* (2013.01)

(58) Field of Classification Search
CPC .......... G06V 10/44; G06V 10/42; G06T 7/11; G06T 2207/10036; G06T 2207/20084; G06T 7/00; G06N 3/04; G06N 3/08
See application file for complete search history.

(56) References Cited

U.S. PATENT DOCUMENTS

| | | |
|---|---|---|
| 8,306,931 B1 | 11/2012 | Bowman et al. |
| 10,909,671 B2 * | 2/2021 | Kimura ................. G06V 10/82 |
| 12,182,721 B2 * | 12/2024 | Hoshen ............... G06F 18/2433 |
| 2017/0196503 A1 | 7/2017 | Narayan et al. |
| 2021/0011791 A1 * | 1/2021 | Okanohara ............. G06N 7/01 |
| 2021/0144167 A1 * | 5/2021 | Glukhov ............. H04L 63/1425 |
| 2021/0192296 A1 * | 6/2021 | Kim ........................ G06N 3/08 |
| 2021/0279491 A1 * | 9/2021 | Burge .................... G06F 18/22 |

(Continued)

OTHER PUBLICATIONS

KIPO, Notice of Refusal to Grant a Patent for Application No. 10-2022-0064978, Aug. 18, 2022, 11 pages.

(Continued)

*Primary Examiner* — Mia M Thomas
(74) *Attorney, Agent, or Firm* — Nicholas Park

(57) ABSTRACT

An anomaly detection device according to one embodiment may comprise: a receiver for receiving a hyperspectral image; and a processor for extracting, on the basis of a plurality of target partial autoencoders corresponding to a plurality of bands included in the hyperspectral image, a plurality of local features corresponding to the plurality of bands, extracting a global feature on the basis of the plurality of local features through an aggregate autoencoder, and detecting anomalies on the basis of the global feature.

1 Claim, 8 Drawing Sheets

(56) References Cited

U.S. PATENT DOCUMENTS

| | | | | |
|---|---|---|---|---|
| 2021/0326728 | A1* | 10/2021 | Kawachi | G06N 20/00 |
| 2022/0309635 | A1* | 9/2022 | Xie | G06T 7/001 |
| 2023/0069960 | A1* | 3/2023 | Mahadevan | G06T 7/11 |
| 2023/0079297 | A1* | 3/2023 | Yako | G06T 7/12 |
| | | | | 348/222.1 |
| 2023/0089481 | A1* | 3/2023 | Liu | G06N 3/0455 |
| | | | | 706/15 |
| 2023/0233171 | A1* | 7/2023 | Bulatov | A61B 6/027 |
| | | | | 378/11 |
| 2023/0325269 | A1* | 10/2023 | Gusat | G06F 11/0709 |
| | | | | 714/2 |
| 2024/0062501 | A1* | 2/2024 | Lee | G06T 7/33 |
| 2024/0080566 | A1* | 3/2024 | Fiebig | H04N 23/695 |
| 2024/0176325 | A1* | 5/2024 | Kim | G05B 19/4065 |
| 2024/0289455 | A1* | 8/2024 | Kim | G06V 10/40 |
| 2024/0411296 | A1* | 12/2024 | Korb | G06T 7/0004 |
| 2025/0036118 | A1* | 1/2025 | Kim | G05B 23/0254 |
| 2025/0143627 | A1* | 5/2025 | Gupta | A61B 5/4094 |

OTHER PUBLICATIONS

KIPO, Decision to Grant a Patent for Korean Patent Application No. 10-2022-0064978, Aug. 29, 2022, 11 pages.

KIPO, Notice of Refusal to Grant a Patent for Application No. 10-2022-0126942, Jan. 16, 2023, 11 pages.

KIPO, Decision to Grant a Patent for Korean Patent Application No. 10-2022-0126942, Feb. 28, 2023, 11 pages.

WIPO, International Search Report and Written Opinion issued for International Application No. PCT/KR2023/010697, Oct. 13, 2023, 11 pages.

Jaime Zabalza et al., Novel segmented stacked autoencoder for effective dimensionality reduction and feature extraction in hyperspectral imaging, Neurocomputing, Dec. 23, 2015.

Jaehyeok Shin, A Study on Stacked Autoencoders and Its Fine-Tuning, A Dissertation submitted in fulfillment of the requirement for the degree of Master of Science in Statistics, The Department of Statistics College of Natural Sciences Seoul National University, Feb. 28, 2015.

Huiqing Wang, A Novel Approach for Drug-Target Interactions Prediction Based on Multimodal Deep Autoencoder, Frontiers in Pharmacology, Jan. 28, 2020.

Javad_T, An autoencoder with multiple inputs, PyTorch Forums, Dec. 2021, (retrieved on Sep. 18, 2023 from the Internet: <URL:https://discuss. pytorch.org/t/an-autoencoder-with-multiple-inputs/139138>).

Liyan Yang et al., Griffin: An Ensemble of AutoEncoders for Anomaly Traffic Detection in SDN, 2020 IEEE Global Communications Conference, Jan. 25, 2021.

Kemilly Dearo Garcia et al., An ensemble of autonomous autoencoders for human activity recognition, Neurocomputing, Jan. 26, 2021.

* cited by examiner

ANOMALY DETECTION DEVICE AND METHOD USING NEURAL NETWORK, AND DEVICE AND METHOD FOR TRAINING NEURAL NETWORK

CROSS-REFERENCE TO RELATED APPLICATION

This application is a U.S. Bypass Continuation Application of International Application No. PCT/KR2023/010697, filed on Jul. 25, 2023, which claims priority to and the benefit of Korean Patent Application No. 10-2022-0064978, filed on May 26, 2022, and Korean Patent Application No. 10-2022-0126942, filed on Oct. 5, 2022, the disclosure of which is incorporated herein by reference in its entirety.

BACKGROUND

Technical Field

The following example embodiments relate to an anomaly detection device using a neural network and a device and method for training the neural network.

Related Art

Hyperspectral Imaging (HSI) may overcome the limitation of red, green, blue (RGB) imaging by capturing property of a material and by measuring a wide wavelength range. HIS has been developed in various fields such as satellite image mapping and land cover imaging. HIS has generally focused on mapping of land cover through machine learning or deep learning. However, great noise makes it difficult to acquire prior information such as background and target spectrum when radiance changes to reflectance due to atmospheric transmission, illumination condition, and sensor noise. Hyperspectral anomaly detection (HAD) is an anomaly detection method that may overcome the aforementioned issues without prior information. HAD detects anomaly by comparing normal data to the same background and pixel under test (PUT). However, the conventional anomaly detection method tends to ignore local noise caused by generalization due to a large scale of channel information in hyperspectral imaging. Therefore, when abnormal data similar to normal data is given as input, the conventional anomaly detection method has difficulty in distinguishing the normal data and the abnormal data.

SUMMARY

Technical Subject

Example embodiments may provide anomaly detection technology using a neural network. However, the technical subjects are not limited to the aforementioned technical subjects and still other technical subjects may be present.

Technical Solution

An anomaly detection device according to an example embodiment may include a receiver configured to receive a hyperspectral image; and a processor configured to extract a plurality of local features corresponding to a plurality of bands based on a plurality of target partial autoencoders corresponding to the plurality of bands included in the hyperspectral image, to extract a global feature based on the plurality of local features through an aggregate autoencoder, and to detect anomalies based on the global feature. The processor may be configured to divide the hyperspectral image into a plurality of windows corresponding to the plurality of bands using a sliding window. The processor may be configured to extract a first local feature by inputting a first window corresponding to a first band among the plurality of bands to a first partial autoencoder, and to extract a second local feature by inputting a second window corresponding to a second band among the plurality of bands to a second partial autoencoder. The processor may be configured to generate an aggregate latent vector by connecting the plurality of local features, to extract the global feature by inputting the aggregate latent vector to an encoder of the aggregate autoencoder, and to extract aggregate output by inputting the global feature to a decoder of the aggregate autoencoder. The processor may be configured to generate a plurality of divided aggregate outputs by dividing the aggregate output, and to generate a plurality of restored images by inputting the plurality of divided aggregate outputs to the plurality of target partial decoders. A neural network training device for anomaly detection according to an example embodiment may include a receiver configured to receive a hyperspectral image; and a processor configured to train a plurality of preliminary partial autoencoders corresponding to a plurality of bands based on the plurality of bands included in the hyperspectral image, and to perform fine tuning on a target neural network based on parameters of the plurality of trained preliminary partial autoencoders. The processor may be configured to load a weight of a preliminary partial encoder of the pretrained preliminary partial autoencoder to a target partial encoder corresponding to the preliminary partial encoder included in the target neural network, and to load a weight of a preliminary partial decoder of the pretrained preliminary partial autoencoder to a target partial decoder corresponding to the preliminary partial decoder included in the target neural network. The processor may be configured to train the target neural network using a loss function that is computed based on a difference between input and output of the target neural network of which fine tuning is completed.

DETAILED DESCRIPTION

Figure 1:
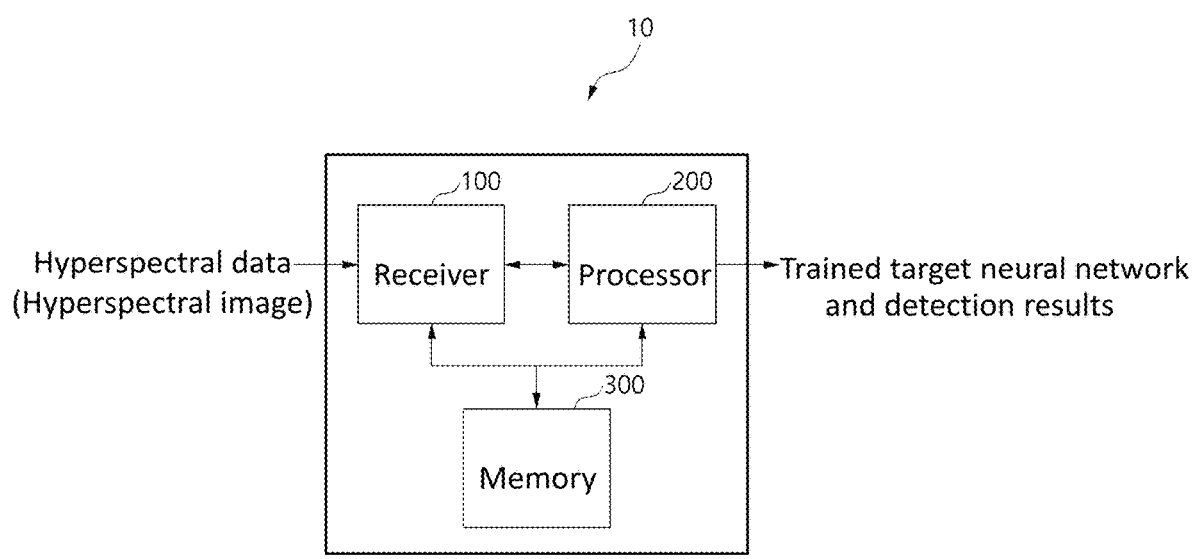
FIG. 1 is a schematic block diagram of an anomaly detection device according to an example embodiment.

The specific structural or functional descriptions of example embodiments according to the concept of the present invention described herein are merely intended for the purpose of describing the example embodiments according to the concept of the present invention and the example embodiments according to the concept of the present invention may be implemented in various forms and are not construed as limited to the example embodiments described herein.

Various modifications may be made to the example embodiments according to the concept of the present invention and thus, the example embodiments are illustrated in the drawings and described in detail through the present specification. However, it should be understood that the example embodiments according to the concept of the present invention are not construed as limited to specific implementations and should be understood to include all changes, equivalents, and replacements within the idea and the technical scope of the present invention.

Although terms of "first," "second," and the like are used to explain various components, the components are not limited to such terms. These terms are used only to distinguish one component from another component. For example, a first component may be referred to as a second component, or similarly, the second component may be referred to as the first component without departing from the scope of rights according to the concept of the present invention.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly accessed" to another component, still other component is absent therebetween. Likewise, expressions, for example, "between" and "immediately between" and "adjacent to" and "immediately adjacent to" may also be construed as described in the foregoing.

The terminology used herein is for the purpose of describing specific example embodiments only and is not to be limiting of the present invention. As used herein, the singular forms "a," "an," and "the" are intended to include the plural forms as well, unless the context clearly indicates otherwise. It will be further understood that the terms "comprises/includes" or "has," when used in this specification, specify the presence of stated features, integers, stages, operations, components, parts, or combinations thereof, but do not preclude the presence or addition of one or more other features, integers, stages, operations, components, parts, or combinations thereof.

Unless otherwise defined, all terms including technical and scientific terms used herein have the same meaning as commonly understood by one of ordinary skill in the art to which the present invention pertains. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

A module used herein may represent hardware that may perform functions and operations according to each name described herein, may represent a computer program code that may perform specific functions and operations, or may be an electronic record medium, for example, a processor and a microprocessor, loaded with the computer program code that may perform specific functions and operations.

That is, the module may represent functional and/or structural combination of hardware for performing the technical spirit of the present invention and/or software for driving the hardware.

Hereinafter, the example embodiments are described in detail with reference to the accompanying drawings. However, the scope of the claims is not limited or restricted by such example embodiments. Like reference numerals presented in each drawing refer to like elements, throughout.

FIG. 1 is a schematic block diagram of an anomaly detection device according to an example embodiment.

Referring to FIG. 1, an anomaly detection device 10 may detect anomalies in data. The anomaly detection device 10 may detect a normal and/or abnormal status of data.

Data may include information in a computer-processible form. The data may be in the form of letters, numbers, sound, and pictures that may be processed by the computer. For example, the data may include an image. The image includes the phase of an object generated by refraction or reflection of light and may represent a shape of the object using a line or a color.

The image may include a hyperspectral image. The hyperspectral image may refer to an image that includes information corresponding to a spectral band corresponding to a plurality of spectral wavelength bands.

The anomaly detection device 10 may detect anomalies in the hyperspectral image using a target neural network. The anomaly detection device 10 may detect anomalies in data by training the target neural network based on learning data (hyperspectral image) and by processing data based on the trained target neural network, and the anomaly detection device 10 that performs a training process may also be referred to as a training device 10. Depending on implementation examples, the anomaly detection device 10 that detects anomalies in an input image and the training device 10 that trains the target neural network used by the anomaly detection device 10 may be implemented through separate devices.

A neural network (or artificial neural network) may include a statistical learning algorithm that mimics neurons in biology in terms of machine learning and cognitive science. The neural network may refer to the overall model in which an artificial neuron (node) forming a network through combination of synapses changes the combination strength of synapses through learning and has the problem-solving capability.

The neuron of the neural network may include a combination of a weight and a bias. The neural network may include at least one layer configured with at least one neuron or node. The neural network may infer results desired to predict from arbitrary input by changing the weight of the neuron through learning.

The neural network may include a deep neural network (DNN). The neural network may include a convolutional neural network (CNN), a recurrent neural network (RNN), perceptron, multilayer perceptron, feed forward (FF), a radial basis network (RBN), deep feed forward (DFF), long short term memory (LSTM), a gated recurrent unit (GRU), an auto encoder (AE), a variational auto encoder (VAE), a denoising auto encoder (DAE), a sparse auto encoder (SAE), Markov Chain (MC), Hopfield network (HN), Boltzmann machine (BM), restricted Boltzmann machine (RBM), a depp belief network (DBN), a deep convolutional network (DCN), a deconvolutional network (DN), a deep convolutional inverse graphics network (DCIGN), a generative adversarial network (GAN), liquid state machine (LSM), extreme learning machine (ELM), an echo state network (ESN), a deep residual network (DRN), differentiable neural computer (DNC), neural turning machine (NTM), a capsule network (CN), Kohonen network (KN), and an attention network (AN).

The anomaly detection device 10 may be implemented as a printed circuit board (PCB) such as motherboard, integrated circuit (IC), or system on chip (SoC). For example, the anomaly detection device 10 may be implemented as an application processor.

Also, the anomaly detection device 10 may be implemented within a personal computer (PC), a data server, or a portable device.

The portable device may be implemented as a laptop computer, a mobile phone, a smartphone, a tablet PC, a mobile Internet device (MID), a personal digital assistant (PDA), an enterprise digital assistant (EDA), a digital still camera, a digital video camera, a portable multimedia player (PMP), a personal navigation device or a portable navigation device (PND), a handheld game console, e-book, or a smart device. The smart device may be implemented as a smart watch, a smart band, or a smart ring.

The anomaly detection device 10 includes a receiver 100 and a processor 200. The anomaly detection device 10 may further include a memory 300.

The receiver 100 may receive a hyperspectral image. The receiver 100 may receive the hyperspectral image from outside or the memory 300. The receiver 100 may include a receiving interface. The receiver 100 may output the received hyperspectral image to the processor 200.

The processor 200 may process data stored in the memory 300. The processor 200 may execute instructions caused by a computer-readable code (e.g., software) stored in the memory 300 and the processor 200.

The "processor 200" may be a data processing device that is implemented as hardware having a circuitry with a physical structure for executing desired operations. For example, the desired operations may include a code or instructions included in a program.

For example, the data processing device implemented as hardware may include a microprocessor, a central processing unit, a processor core, a multi-core processor, a multiprocessor, an application-specific integrated circuit (ASIC), and a field programmable gate array.

The processor 200 may extract a plurality of local features corresponding to a plurality of bands based on a plurality of target partial autoencoders corresponding to the plurality of bands included in the hyperspectral image.

The processor 200 may extract a first local feature by inputting a first window corresponding to a first band among the plurality of bands to a first target partial autoencoder. The processor 200 may extract a second local feature by inputting a second window corresponding to a second band among the plurality of bands to a second target partial autoencoder. The first window may include spectral data corresponding to wavelengths included in the first band of the hyperspectral image, and the second window may include spectral data corresponding to wavelengths included in the second band of the hyperspectral image. The local feature is further described with reference to FIG. 2.

The processor 200 may perform anomaly detection using the target neural network. The processor 200 may divide the hyperspectral image into a plurality of windows corresponding to the plurality of bands using a sliding window. The sliding window is further described with reference to FIG. 2.

The processor 200 may generate a plurality of local features by inputting the plurality of windows to a plurality of target partial encoders corresponding thereto, respectively.

The processor 200 may extract a global feature by inputting results of connecting the plurality of local features to an aggregate autoencoder.

The processor 200 may generate an aggregate latent vector by connecting the plurality of local features. The processor 200 may extract the global feature by inputting the aggregate latent vector to an encoder of the aggregate autoencoder.

The processor 200 may generate aggregate output by inputting the global feature to a decoder of the aggregate autoencoder.

The processor 200 may generate a plurality of restored band spectra by inputting results of dividing the aggregate output to a plurality of target partial decoders.

The processor 200 may detect anomalies based on the plurality of restored band spectra. In more detail, the processor 200 may detect anomalies through a difference between a restored image and an input image based on the plurality of restored band spectra.

The processor 200 may train the target neural network for anomaly detection.

The processor 200 may train the plurality of preliminary partial autoencoders corresponding to the plurality of bands, respectively, based on the plurality of bands included in the hyperspectral image (learning data). In more detail, the processor 200 may train the plurality of preliminary partial autoencoders by updating parameters (weights) of the plurality of preliminary partial autoencoders to minimize a loss value computed using a loss function computed through the preliminary partial autoencoder.

The processor 200 may perform fine tuning on the target neural network in which the plurality of target partial encoders, the aggregate autoencoder, and the plurality of target partial decoders are sequentially combined based on parameters of the plurality of trained preliminary partial autoencoders. Fine tuning may represent a procedure of loading a weight of the primarily trained preliminary partial autoencoder to a corresponding target partial encoder and target partial decoder included in the target neural network.

For fine tuning, the processor 200 may primarily train the plurality of preliminary partial autoencoders based on a loss function using difference between input and output of the preliminary partial autoencoder. In this case, the processor 200 may train the preliminary partial autoencoders by updating weights of preliminary partial encoders and preliminary partial decoders included in the plurality of preliminary partial autoencoders in the direction of minimizing the loss value computed through the loss function.

The processor 200 may load weights of the plurality of trained preliminary partial autoencoders to the plurality of target partial encoders and the plurality of target partial decoders included in the target neural network (allocate a weight of a preliminary partial autoencoder to a corresponding target partial encoder or target partial decoder), and may train the target neural network in which the plurality of target partial encoders, the aggregate autoencoder, and the plurality of target partial decoders are sequentially connected using the loss function computed through input/output of the target neural network.

The memory 300 may store instructions (or program) executable by the processor 200. For example, the instructions may include instructions for executing an operation of the processor and/or an operation of each component of the processor.

The memory 300 may be implemented as a volatile memory device or a nonvolatile memory device.

The volatile memory device may be implemented as dynamic random access memory (DRAM), static random access memory (SRAM), thyristor RAM (T-RAM), zero capacitor RAM (Z-RAM), or twin transistor RAM (TTRAM).

The nonvolatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate memory (NFGM), holographic memory, molecular electronic memory device, or memory insulator resistance change memory.

Figure 2:
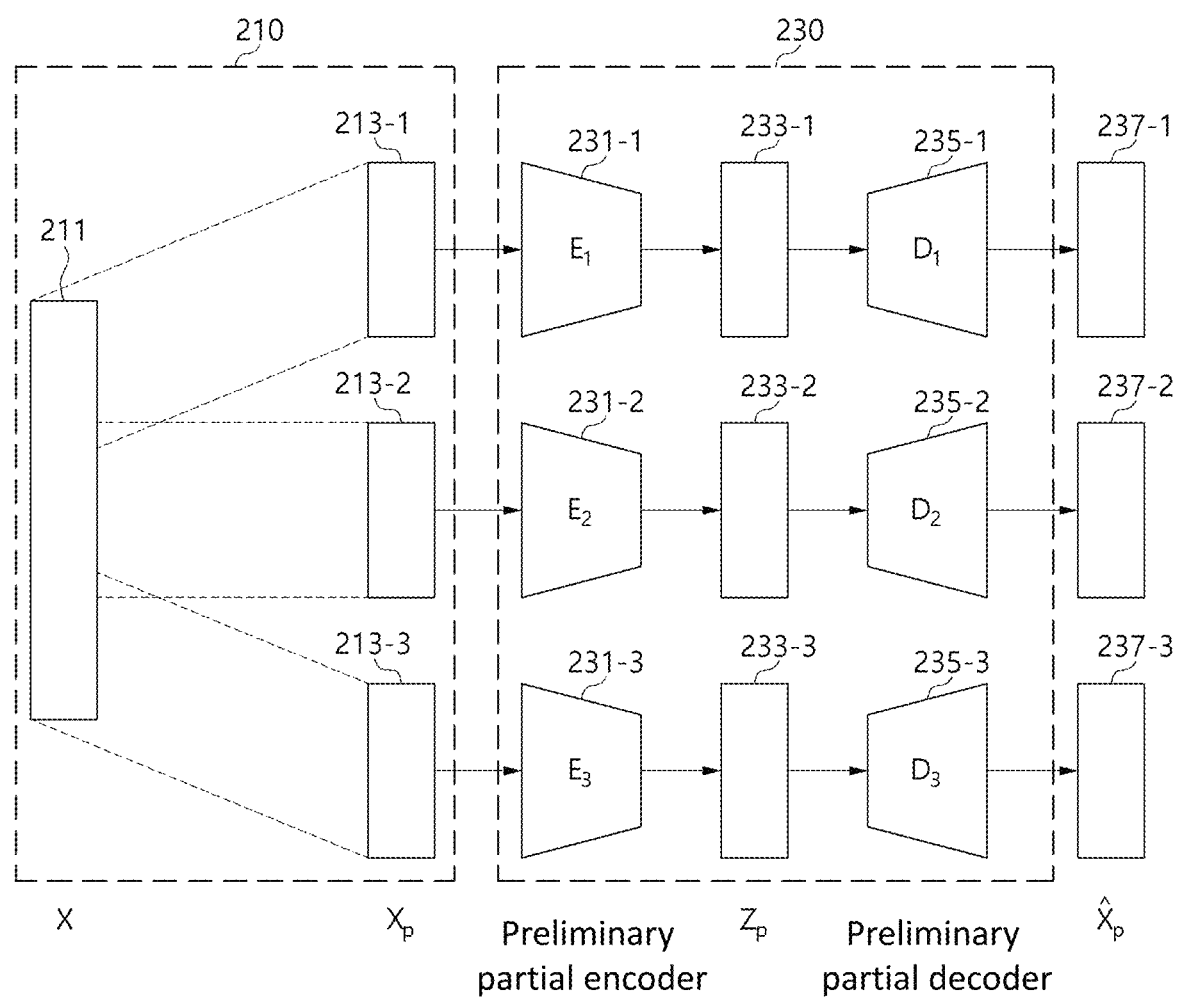
FIG. 2 illustrates an example of a preliminary partial autoencoder used for training a target neural network used by a training device of FIG. 1.
Figure 3:
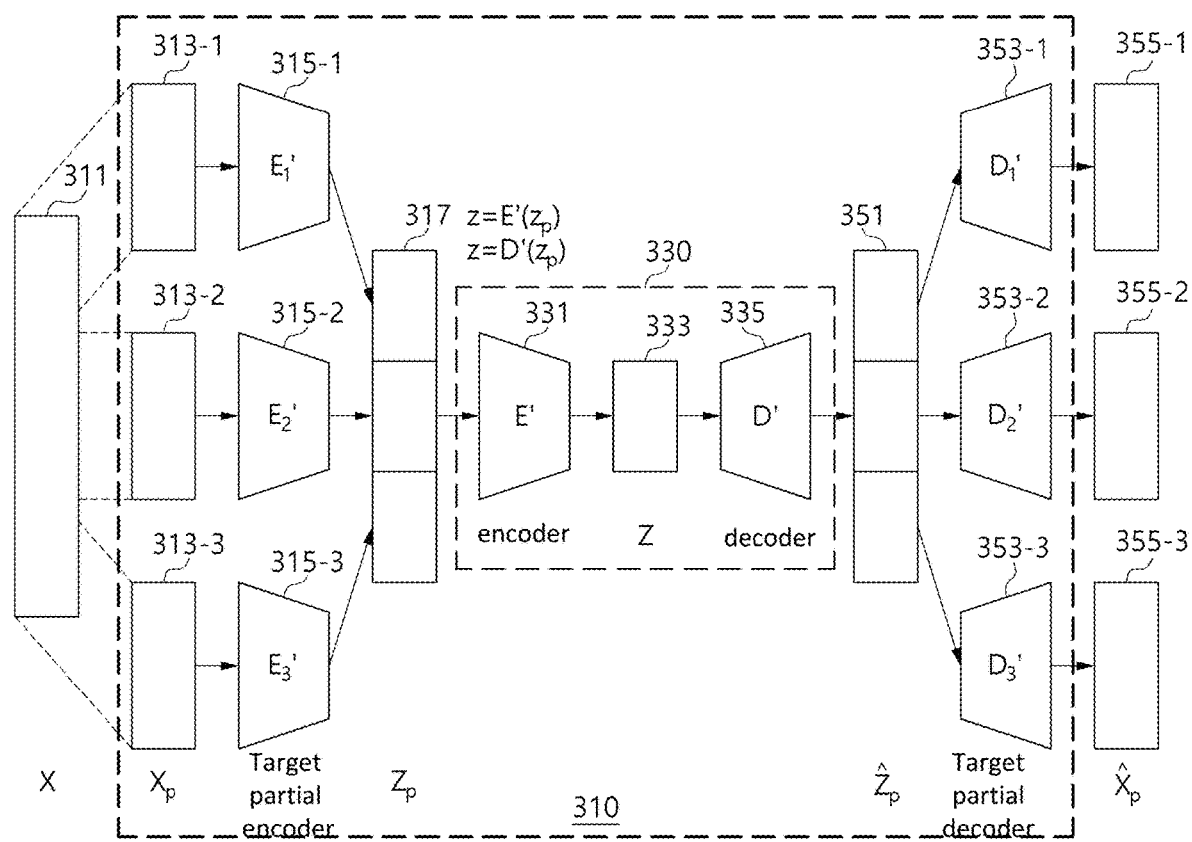
FIG. 3 illustrates an example of a target neural network used by the anomaly detection device of FIG. 1.

FIG. 2 illustrates an example of a preliminary partial autoencoder used for training a target neural network used by a training device of FIG. 1, and FIG. 3 illustrates an example of a target neural network used by an anomaly detection device of FIG. 1.

Referring to FIGS. 2 and 3, a processor (e.g., processor 200 of FIG. 1) may perform anomaly detection on an input image using a target neural network 310. Final training of the target neural network 310 used by the processor 200 may be performed after performing fine tuning based on parameters of a plurality of pretrained preliminary partial autoencoder 230.

The plurality of preliminary partial autoencoders 230 may include a plurality of preliminary partial encoders 231-1, 231-2, and 231-3 and a plurality of preliminary partial decoders 235-1, 235-2, and 235-3.

The processor 200 may train the plurality of preliminary partial autoencoders 230 through a plurality of bands 213-1, 213-2, and 213-3 divided from an input hyperspectral image (learning data) 211 through a splitter 210. Herein, what a band refers to may be the same as what a window refers to.

The processor 200 may train the target neural network 310 used to perform anomaly detection using the plurality of preliminary partial autoencoders 230.

The target neural network 310 may include a plurality of target partial encoders 315-1, 315-2, and 315-3, an aggregate autoencoder 330, and a plurality of target partial decoders 353-1, 353-2, and 353-3.

The aggregate autoencoder 330 may include an encoder 331 and a decoder 335.

The processor 200 may generate the plurality of bands 213-1, 213-2, and 213-3 by dividing the hyperspectral image (learning data) 211 using the sliding window. The plurality of bands 213-1, 213-2, and 213-3 may be referred to as a local band spectrum. For example, the plurality of bands 213-1, 213-2, and 213-3 may include spectral data corresponding to individual wavelengths included in the hyperspectral image 211. For example, when the hyperspectral image includes spectral data related to 90 wavelengths, each of the plurality of bands 213-1, 213-2, and 213-3 may include 30 pieces of spectral data in order of wavelengths. Each of the plurality of bands 213-1, 213-2, and 213-3 may include spectral data corresponding to 40 wavelengths according to the sliding window size. In this case, each of the plurality of bands 213-1, 213-2, and 213-3 may include overlapping spectral data. A method of determining the plurality of bands 213-1, 213-2, and 213-3 may be equally applied to a method of determining a plurality of bands 313-1, 313-2, and 313-3 described below.

The processor 200 may input the generated lobal band spectra 213-1, 213-2, and 213-3 to the plurality of preliminary partial autoencoders 230.

The plurality of preliminary partial encoders 231-1, 231-2, and 231-3 may extract a plurality of local features 233-1, 233-2, and 233-3, respectively. The plurality of preliminary partial encoders 231-1, 231-2, and 231-3 may include the first preliminary partial encoder 231-1, the second preliminary partial encoder 231-2, and the third preliminary partial encoder 231-3. The plurality of local features 233-1, 233-2, and 233-3 may include the first local feature 233-1, the second local feature 233-2, and the third local feature 233-3.

The processor 200 may generate a plurality of partial outputs (also, referable as restored local band spectra) 237-1, 237-2 and 237-3 using the plurality of preliminary partial encoders 231-1, 231-2, and 231-3 and the plurality of preliminary partial decoders 235-1, 235-2, and 235-3. In more detail, the processor 200 may generate the plurality of partial outputs 237-1, 237-2 and 237-3 by inputting the plurality of local features 233-1, 233-2, and 233-3 to the corresponding plurality of preliminary partial decoders 235-1, 235-2, and 235-3.

The processor 200 may train the plurality of preliminary partial autoencoders 230 based on a loss function that is determined by a difference between the plurality of bands 213-1, 213-2, and 213-3 and the plurality of partial outputs 237-1, 237-2, and 237-3 acquired through the learning data 211. In the following description, target partial encoders 315-1, 315-2, and 315-3 and target partial decoders 353-1, 353-2, and 353-3 included in the target neural network 310 may operate in the same manner as the aforementioned preliminary partial encoders 213-1, 213-2, and 213-3 and preliminary partial decoders 235-1, 235-2, and 235-3.

In the process of detecting an outlier from an input hyperspectral image 311, the processor 200 may generate the plurality of bands 313-1, 313-2, and 313-3 by dividing the hyperspectral image 311 using a sliding window. The plurality of bands 313-1, 313-2, and 313-3 may include the first band 313-1, the second band 313-2, and the third band 313-3, and each band may include spectral data related to a corresponding wavelength in the hyperspectral image 311. Although the plurality of bands 313-1, 313-2, and 313-3 include three bands and information of each wavelength of the hyperspectral image 311 is divided for clarity of description, the present invention is not limited thereto and it will be apparent to one of ordinary skill in the art that it may be divided into any number of bands.

The plurality of target partial encoders 315-1, 315-2, and 315-3 may operate in the same manner as the plurality of preliminary partial encoders 231-1, 231-2, and 231-3.

The processor 200 may generate an aggregate latent vector 317 by connecting a plurality of local features generated by the plurality of target partial encoders 315-1, 315-2, and 315-3.

The encoder 331 may generate a global feature 333 based on the aggregate latent vector 317. The decoder 335 may generate an aggregate output 351 based on the global feature 333. The aggregate output 351 may correspond to results in which the aggregate latent vector 317 is restored through the aggregate autoencoder 330.

The plurality of target partial decoders 235-1, 235-2, and 235-3 may operate in the same manner as the plurality of preliminary partial decoders 235-1, 235-2, and 235-3 described above, and may restore local band spectra 355-1, 355-2, and 355-3 from the plurality of local features included in the aggregate output 351.

The processor 200 may train the local features for the plurality of preliminary partial autoencoders 230 based on the aforementioned loss function and then, may load the parameters (or weights) of the plurality of preliminary partial autoencoders 230 (e.g., parameters of the plurality of preliminary partial encoders 231-1, 231-2, and 231-3 and the plurality of preliminary partial decoders 235-1, 235-2, and 235-3) to the plurality of partial target encoders 315-1, 315-2, and 315-3 and the plurality of target partial decoders 353-1, 353-2, and 353-3. In more detail, the processor 200 may initially perform a loading process by loading the parameter of the preliminary partial encoder 231-1 for which training is completed to the target partial encoder 315-1 and by allocating the parameter of the preliminary partial decoder 235-1 for which training is completed to the target partial decoder 353-1.

The processor 200 may train the target neural network 310 based on the loss function that is computed based on a difference between the plurality of bands 313-1, 313-2, and 313-3 acquired through input learning data and the restored local band spectra 355-1, 355-2, and 355-3 corresponding to output of the target neural network 310. In more detail, the processor 200 may train the target neural network through a method of updating individual parameters of the target neural network 310 in the direction of minimizing a loss value computed through the aforementioned loss function.

Since the aggregate autoencoder 330 has a shallow depth sufficient to transfer an abnormal local feature to the global feature 333, the global feature (global latent vector) 333 may be sensitive to anomalies.

The processor 200 may restore results output using normal input to be the same as input, and may distinguish results output using abnormal input from input having a normal spectrum.

To solve the issue that the conventional autoencoder does not detect local singularity of a wide range of spectral input, the processor 200 may generate a plurality of windows (bands 313-1, 313-2, and 313-3) by dividing the hyperspectral image 311 using the sliding window and may perform training to restore partial spectra using a plurality of autoencoders.

The input hyperspectral image may be defined as x, and the input x may be divided into N windows (bands) by the sliding window with a size (width) of $W_s$ and stride S. Although FIGS. 2 and 3 illustrate examples in which N is 3, N may be less than or greater than 3 depending on example embodiments.

The processor 200 may generate a plurality of windows (bands) $x_p \in \{x_1; x_2, \ldots, x_N\}$ by dividing an input image (input spectrum) x. $x_i$ may denote a window of an input spectrum in index $i \in \{1, \ldots, N\}$. Here, N may denote a total number of windows (bands) generated through the sliding window.

If the size of the sliding window is equal to the number of bands, $x = x_p$. Local features of the target neural network 310 and the plurality of preliminary partial autoencoders 230 and may be defined as $z_p \in \{z_1, z_2, \ldots z_N\}$, and $z_i$ may represent output of a partial encoder for given $x_i$.

The preliminary partial encoder and the preliminary partial decoder of the preliminary partial autoencoder 230 may be expressed as $E_p$ and $D_p$, respectively. The preliminary partial encoder and the preliminary partial decoder may include N encoders $E_p \in \{E_1, E_2, \ldots E_N\}$ and N decoders $D_p \in \{D_1, D_2, \ldots D_N\}$, respectively. The target partial encoder and the target partial decoder included in the target neural network 310 may be expressed as $E_p{'}$ and $D_p{'}$, respectively.

For given sample $x_i$, the preliminary partial encoders 231-1, 231-2, and 231-3 may generate the local features $z_i$, and the preliminary partial decoder 235-1, 235-2, and 235-3 may restore $\hat{x}_i$ with the same dimension as $x_i$ from $z_i$. Operations of the preliminary partial encoders 231-1, 231-2, and 231-3 and the preliminary partial decoders 235-1, 235-2, and 235-3 may be expressed as Equation 1.

$$z_i = E_n(x_i) \quad \text{[Equation 1]}$$
$$\hat{x}_i = D_n(z_i)$$

The preliminary partial autoencoder 230 may generate $\hat{x}_p \in \{\hat{x}_1, \hat{x}_2, \ldots \hat{x}_N\}$ for given $x_p$. The processor 200 may perform training to minimize a reconstruction error for each window. Here, the loss function may be $$L = \|x_i - \hat{x}_i\|_2^2.$$

The processor 200 may allow the preliminary partial autoencoder 230 to focus on local band anomaly by reducing the number of spectral bands and by sensitively expressing a local latent vector compared to a general autoencoder.

The processor 200 may reflect parameters of the preliminary partial encoders 231-1, 231-2, and 231-3 and the preliminary partial decoders 235-1, 235-2, and 235-3 determined through the foregoing training to the corresponding target partial encoders 313-1, 313-2, and 313-3 and preliminary partial decoders 353-1, 353-2, and 353-3 of the target neural network 310.

The aggregate autoencoder 330 may use the aggregate latent vector 317 that connects the local features $z_p$ as input. The aggregate autoencoder 330 may generate the global feature 333, z, by compressing the aggregate latent vector 317 and may generate the aggregate output 351, $\hat{z}_p$, from the global feature 333. z may represent the global feature 333 as output of the encoder 331 to input of the aggregate latent vector 317. The operation of the aggregate autoencoder 330 may be represented as Equation 2.

$$z = E'(z_p) \quad \text{[Equation 2]}$$
$$\hat{z}_p = D'(z)$$

Here, E' denotes the encoder 331 of the aggregate autoencoder 330 and D' denotes the decoder 335. The purpose of the aggregate autoencoder 330 may be to extract the global feature 333 and to integrate $\hat{z}_p$. Therefore, the aggregate autoencoder 330 may be configured as a shallow layer such that a normal local feature may affect the global feature 333.

A method of the processor 200 training the target neural network 310 is further described as below.

The processor 200 may train the target neural network 310 through two stages. In a first stage, the processor 200 may generate partial output $\hat{x}_p$ from learning data x using the plurality of preliminary partial encoders 231-1, 231-2, and 231-3 and the plurality of preliminary partial decoders 235-1, 235-2, and 235-3.

The processor 200 may train the preliminary partial autoencoder 230 based on the loss function of Equation 3.

$$L = \|x_p - \hat{x}_p\|_2^2 \quad \text{[Equation 3]}$$

Here, $x_p$ may represent a window (band) acquired by dividing x as the input spectrum (or hyperspectral image)

using the sliding window. $\hat{x}_p$ may have the same dimension as the input spectrum as the output of the preliminary partial decoders 235-1, 235-2, and 235-3. Due to a partial band, the preliminary partial autoencoder 230 may generate a local feature (local latent vector) that is sensitive to local band anomaly and different from normal for abnormal input.

In a second stage, the processor 200 may perform fine tuning on the target neural network 310. The processor 200 may perform fine tuning on the target neural network 310 of FIG. 3. The processor 200 may load the parameters of the preliminary partial autoencoders 230 to the corresponding plurality of target partial encoders 315-1, 315-2, and 315-3 and plurality of target partial decoders 353-1, 353-2, and 353-3. Since the target neural network 310 may be dominantly affected by the global feature 333 by the aggregate autoencoder 330, fine tuning may be essential to ensure features of the preliminary partial autoencoders 230.

The processor 200 may train the target neural network 310 using the loss function of Equation 3 that is computed through output of the target neural network 310 using the learning data x as input.

The processor 200 may perform outlier detection by processing the hyperspectral image using the plurality of target partial encoders 315-1, 315-2, and 315-3, the encoder 331, the decoder 335, and the plurality of target partial decoders 353-1, 353-2, and 353-3 of the trained target neural network 310.

The plurality of target partial encoders 315-1, 315-2, and 315-3 may extract the local features, and the encoder 331 may generate the global feature 333 by using the aggregate latent vector 317 generated through the local features as input. The decoder 335 may have a symmetrical structure with the encoder 331 and may generate the aggregate output 351 from the global feature 333. The plurality of target partial decoders 353-1, 353-2, and 353-3 may restore the local band spectra 355-1, 355-2, and 355-3 corresponding to the same output as $x_p$ from the aggregate output 351. For the loss function, the processor 200 may use the loss function in the same type as a training process of the partial autoencoder 230, but a detailed value may be slightly different based on a difference in a structure of the neural network.

Figure 4:
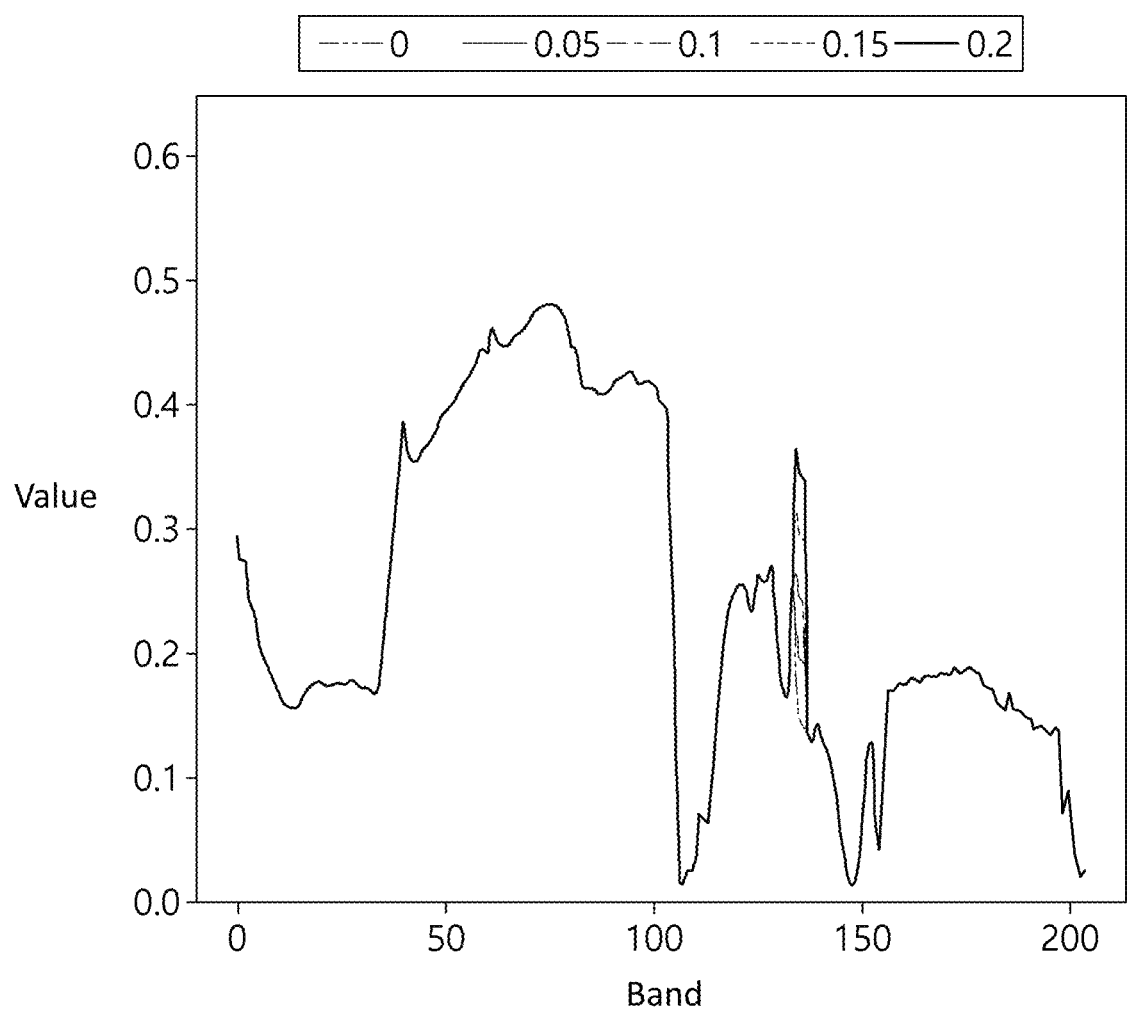
FIG. 4 illustrates an example of an input spectrum.
Figure 5:
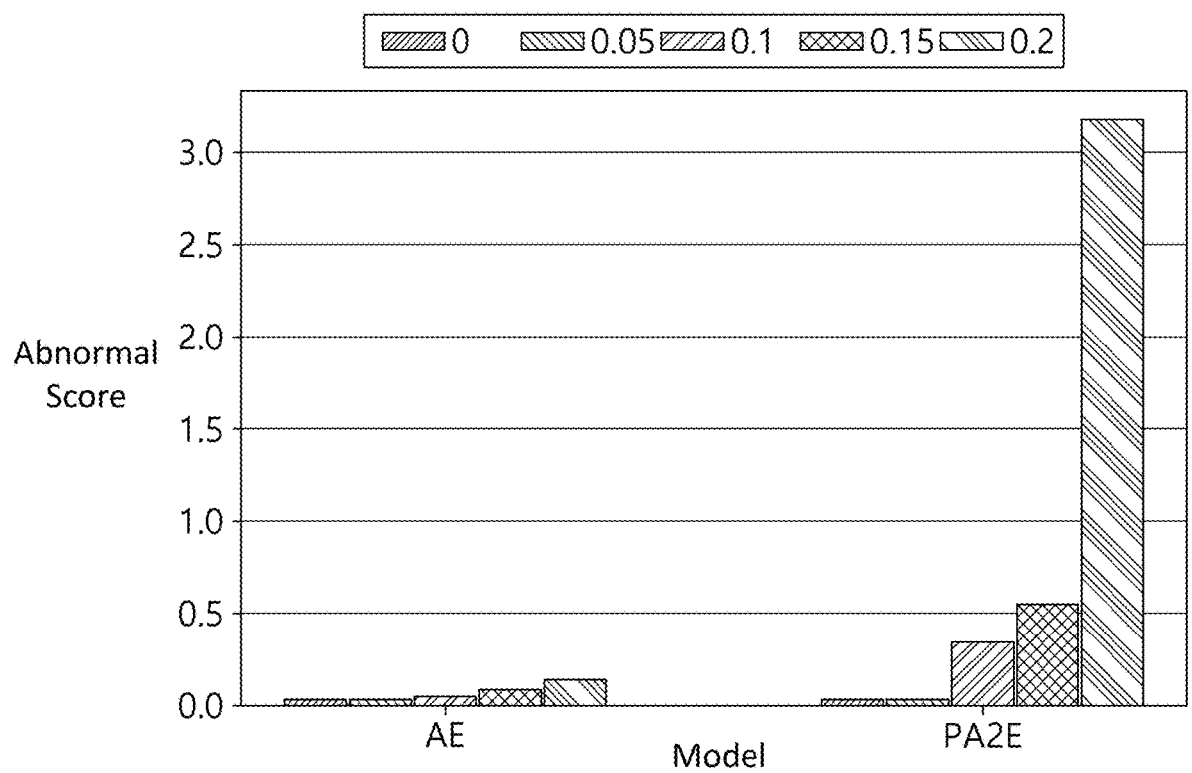
FIG. 5 illustrates an example of abnormal score.
Figure 6:
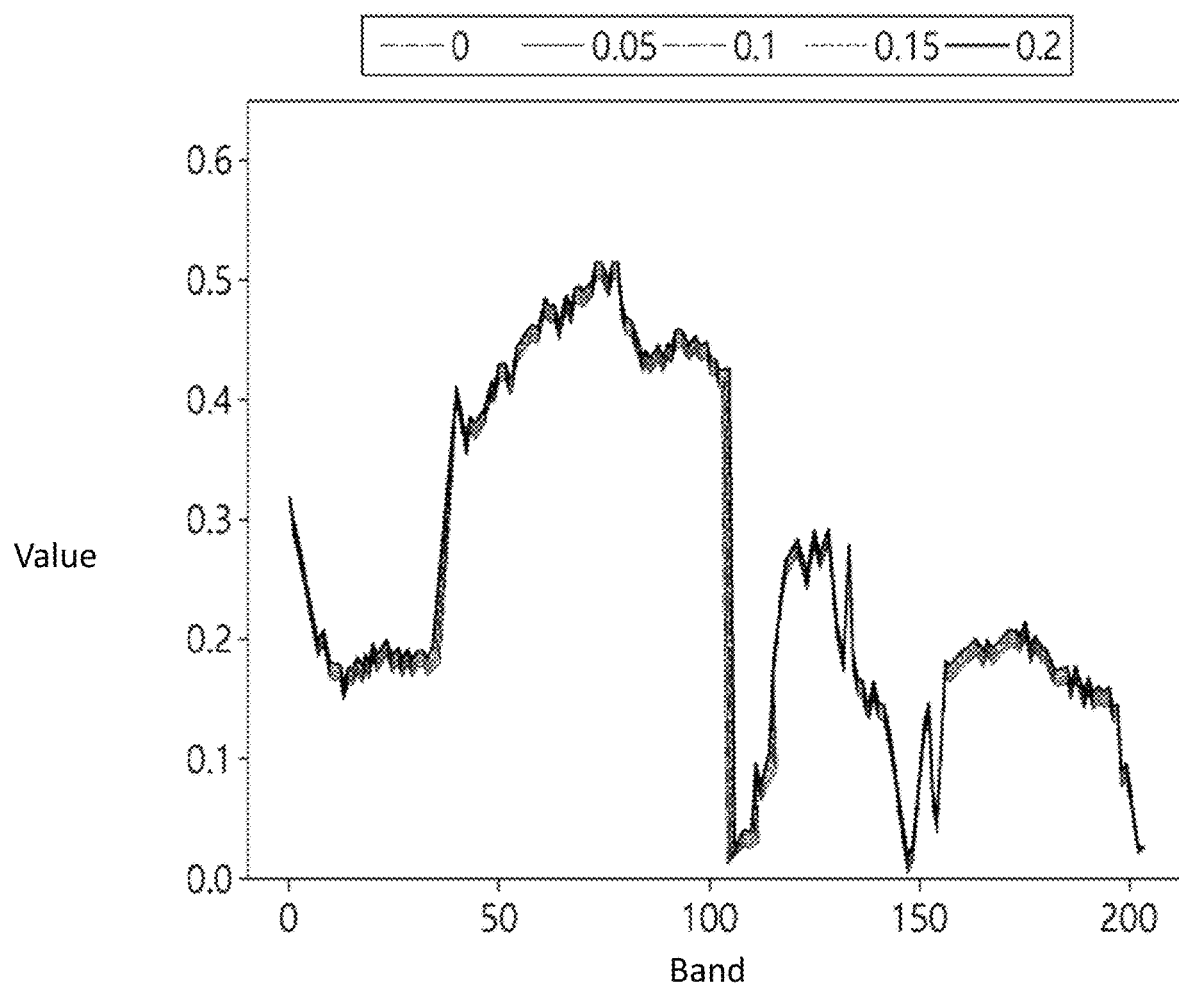
FIG. 6 illustrates an example of output of an autoencoder.
Figure 7:
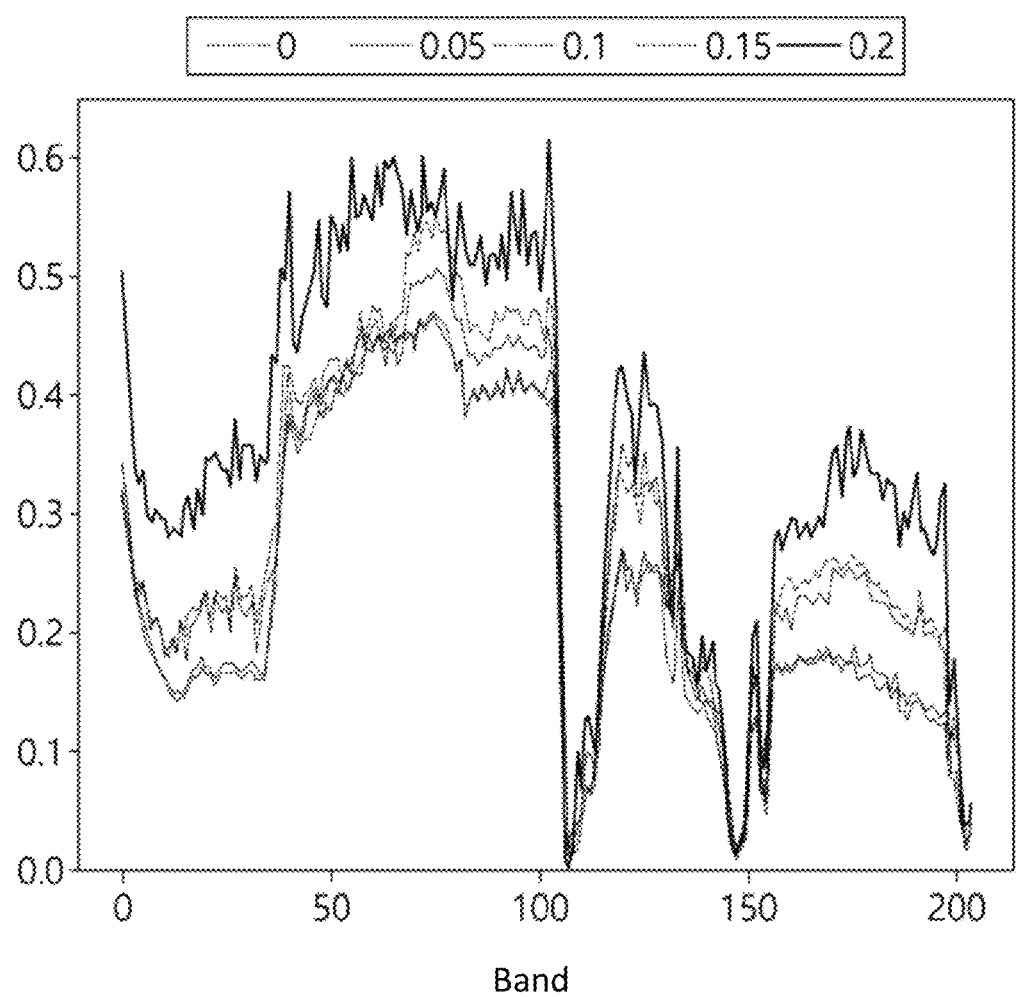
FIG. 7 illustrates an example of output of a target neural network.

FIG. 4 illustrates an example of an input spectrum, and FIG. 5 illustrates an example of abnormal score. FIG. 6 illustrates an example of output of an autoencoder, and FIG. 7 illustrates an example of output of a target neural network.

Referring to FIGS. 4 to 7, a processor (e.g., processor 200 of FIG. 1) may perform anomaly detection using a target neural network. In the following, dataset on which anomaly detection is performed, experimental conditions, and anomaly detection performance are described.

Since prior information on a target and background may not be used in a hyperspectral anomaly detection (HAD) dataset, a data purification method may be essential to train a model and to learn characteristics of the background. However, due to diversity of materials in the HAD dataset, some background spectra may not be included in training samples.

In the case of a background class with little data, it may be removed through data purification. For background with little data, abnormality may be defined through a high performance algorithm and a low performance algorithm may be defined as background and interfere with model performance evaluation.

Hyperspectral imaging (HSI) may be acquired from short-range distance in the food or semiconductor industry. HIS may generate sparse nose and be easy to acquire normal data. On the contrary, HIS may be difficult to acquire abnormal data.

Data purification may not be required in a specific field in which learning data is sufficient to perform accurate evaluation. This may make conditions of HAD similar to anomaly detection (AD) and normal data with little or no abnormal data may be given as a training sample. In subsequent experiments, performance of the anomaly detection device 10 may be evaluated using a dataset used for a classification task in AD.

A dataset with ground truth for each class may be used instead of the HAD dataset. The experiments were performed on three open datasets, Indian Pines (IP), Salinas Valley (SV), and University of Houston (HS), and the datasets have been used for HIS classification. Table 1 shows information on each dataset.

TABLE 1

| Dataset | Shape | Class | Rate (%) | | |
| --- | --- | --- | --- | --- | --- |
| | | | Train | Valid | Test |
| IP | (145 × 145 × 200) | 16 | 10 | 10 | 80 |
| SV | (512 × 217 × 204) | 16 | 2 | 2 | 96 |
| HS | (905 × 349 × 144) | 15 | 5 | 5 | 90 |

The IP dataset is acquired by an airborne visible/infrared imaging spectrometer (AVIRIS) sensor and acquired by capturing Indian Pines. IP has a resolution of 145×145 pixels, 224 bands, and 16 classes. The number of bands may be reduced to 200 by noise band and water absorption. The SV dataset is acquired by capturing Salinas Valley using the AVIRIS sensor. Same as the IP dataset, the water absorption band is removed and the shape of the SV dataset has 16 classes and the shape is 512×217×204.

The HS dataset is acquired by the University of Houston and has a shape of 1905×349×144 with 15 classes. 2%, 5%, and 10% of training samples may be extracted from the SV, the HS, and the IP datasets, respectively, without background.

Training and valid samples are pure data without any anomaly and the background of HIS includes various materials so multimodal normality in which one class is abnormal and other classes are normal is used.

The anomaly detection device 10 may be compared to One-Class Support Vector Machine (OC-SVM), Kernel Density Estimation (KDE), Local Outlier Factor (LOF), Deep Support Vector Data Description (DSVDD), Memory-augmented Autoencoder (MemAE), and Reconstruction along Projection Pathway (RAPP).

Since a typical AE model may be replaced by the anomaly detection device 10, a model to which the anomaly detection device 10 is applied may be indicated by adding prefix "PA2E." For example, the model may be indicated as PA2E-MemAE and PA2E-RAPP. Although there was a conventional method of using both space and spectrum, the anomaly detection device 10 considers only spectral features to facilitate expansion from AD to HAD.

The target neural network used by the anomaly detection device 10 has ten fully connected (FC) layers. After the FC layers except for last of the target partial encoder and the target partial decoder and the encoder and the decoder of the aggregate autoencoder, batch normalization and leaky rectified linear unit are added.

In PA2E-MemAE and PA2E-RAPP, a total of ten FC layers may be present since the target partial autoencoder has seven FC layers and the aggregate autoencoder has three FC layers. PA2E-DSVDD has nine and 1 FC layers. The hidden size of the encoder is set to gradually change a size of a latent vector and the decoder has a symmetrical hidden size. The size of the latent vector (feature) is set to 20 for the target partial autoencoder and the aggregate autoencoder.

A deep learning model is trained using Adam optimizer with a learning rate of 0.001 and a batch size is set to 100.

Except for DSVDD, epochs of standard models are set to 100. DSVDD is set to 50 epochs for training the AE and others may be used to train the encoder to approach a center point.

PA2E-MemAE, PA2E-RAPP, and the target partial autoencoder are trained for 50 epochs for local features, and the target neural network is trained for remaining epochs. For PA2E-DSVDD, additional 50 epochs may be allocated for training of the target partial autoencoder. Here, a remaining processing process is the same as DSVDD.

In MemAE, a size (dimension) of a memory module is set to 100 with a shrinkage threshold of 0.00025. Since PA2E-RAPP shows excellent results, a difference in an output feature map is used in the aggregate autoencoder.

An area under the curve of receiver operating characteristic (AUC) is used for metric and a receiver operating characteristic (ROC) is a graph that measures performance of a model depending on a threshold, and the AUC represents an area under the curve of the ROC.

The performance of the model is measured using the AUC for five different seeds and, as described above, the multimodal regularity in which one class is set to abnormal and other classes are set to normal is adopted. Performance of each dataset is measured as the overall average of the AUC for different abnormal classes and seeds.

Some conventional deep learning-based methods are used as baseline for comparison. Table 2 shows the AUC for the respective methods on three different datasets.

TABLE 2

| Method | IP | SV | HS |
|---|---|---|---|
| OC-SVM | 0.436 | 0.538 | 0.524 |
| KDE | 0.686 | 0.653 | 0.536 |
| LOF | 0.682 | 0.894 | 0.776 |
| DSVDD | 0.647 | 0.761 | 0.672 |
| MemAE | 0.709 | 0.808 | 0.68 |
| RAPP | 0.632 | 0.854 | 0.722 |
| PA2E-DSVDD | 0.734 | 0.885 | 0.758 |
| PA2E-MemAE | 0.732 | 0.857 | 0.709 |
| PA2E-RAPP | 0.751 | 0.918 | 0.777 |

LOF shows the highest conventional AUC compared to deep learning methods. When the anomaly detection device 10 is applied, RAPP may exhibit superior performance than LOF. When the anomaly detection device 10 is applied, the autoencoder may show superior performance compared to standard methods in terms of AUC. Due to a memory module that converts latent vectors (features) into one in the memory module, PA2E-MemAE may have a small increase amount compared to PA2E-DSVDD and PA2E-RAPP. The anomaly detection device 10 may improve the performance of standard models and may be applied to various AE-based models, such as DSVDD, MemAE, and RAPP, to show high scalability and efficiency.

Examples of FIGS. 4 to 7 may represent normalized spectra to describe the operation of the anomaly detection device 10. The SV dataset may have a similar spectrum for each class. To match dimensions of output, sizes of a window and a stride may be 34 and 34, respectively. The target partial autoencoder and the aggregate autoencoder may have seven layers and three layers, respectively.

FIG. 4 illustrates an example of an input spectrum. A spectrum may be derived from training samples to satisfy the assumption that normal data is well restored. Noise may be found in bands 134, 135, and 136, and the strength range may be from 0.05 to 2. Output decoded from standard AE may be similar to input shown in FIG. 6.

Output of the anomaly detection device 10 may represent different output according to an increase in noise, and FIG. 7 may represent this output. Low noise may be referred to as sparse noise and high noise may be referred to as local singularity and may indicate defect at a specific point.

The abnormal score of the anomaly detection device 10 dramatically increases when noise intensity is 0.2. The anomaly detection device 10 may show superior performance by detecting local singularity and by generating output that is significantly different from input.

Since local features depend on the window size and the stride size, the sizes of the window and the stride may affect the anomaly detection performance. Various window and stride sizes are used to optimize hyperparameters for each dataset.

First, different sizes of windows were used. The optimal stride was assumed to be half of the window size and the experiments were performed with three layers of the aggregate autoencoder. Table 3 shows performance according to the window size.

TABLE 3

| Dataset | (Ws, S) | PA2E-MEMEAE | PA2E-RAPP | PA2EDSVDD |
|---|---|---|---|---|
| IP | (24, 11) | 0.675 | 0.73 | 0.751 |
|  | (35, 15) | 0.68 | 0.732 | 0.746 |
|  | (50, 25) | 0.694 | 0.713 | 0.75 |
|  | (80, 40) | 0.682 | 0.715 | 0.741 |
| SV | (24, 12) | 0.848 | 0.856 | 0.898 |
|  | (34, 17) | 0.84 | 0.843 | 0.902 |
|  | (48, 26) | 0.835 | 0.857 | 0.918 |
|  | (68, 34) | 0.821 | 0.839 | 0.909 |
| HS | (24, 12) | 0.75 | 0.703 | 0.777 |
|  | (36, 18) | 0.72 | 0.693 | 0.758 |
|  | (48, 24) | 0.719 | 0.709 | 0.759 |
|  | (72, 36) | 0.684 | 0.683 | 0.755 |

The optimal window size may differ depending on datasets, but it can be verified that the superior performance is provided when the window size is 24. Due to dependence on data, the window size needs to be optimized for a target dataset. Therefore, the window size may be set as a variable that shows superior performance compared to other window sizes of each dataset. As shown in Table 4, three different stride sizes similar to the optimal window size may be employed.

TABLE 4

| Method | Type | IP | SV | HS |
|---|---|---|---|---|
| PA2E-DSVDD | Q | (50, 10) | (24, 6) | (24, 6) |
|  | H | (50, 25) | (24, 12) | (24, 12) |
|  | O | (50, 50) | (24, 18) | (24, 24) |
| PA2E-MemAE | Q | (35, 5) | (48, 12) | (48, 12) |
|  | H | (35, 15) | (48, 26) | (48, 24) |
|  | O | (35, 33) | (48, 39) | (48, 48) |

TABLE 4-continued

| Method | Type | IP | SV | HS |
|---|---|---|---|---|
| PA2E-RAPP | Q | (24, 4) | (48, 12) | (24, 6) |
| | H | (24, 11) | (48, 26) | (24, 12) |
| | O | (24, 22) | (48, 39) | (24, 24) |

A type of stride may refer to a ratio of the stride to the window size. Q denotes a quarter ratio, H denotes a half ratio, and O denotes a one ratio. The window size is preset to an optimal variable and the number of layers of the aggregate autoencoder is set to 3. Table 5 shows AUC performance according to various stride sizes.

TABLE 5

| Method | Type | IP | SV | HS |
|---|---|---|---|---|
| PA2E-DSVDD | Q | 0.685 | 0.834 | 0.741 |
| | H | 0.694 | 0.848 | 0.75 |
| | O | 0.69 | 0.858 | 0.738 |
| PA2E-MemAE | Q | 0.725 | 0.839 | 0.687 |
| | H | 0.732 | 0.857 | 0.709 |
| | O | 0.729 | 0.843 | 0.696 |
| PA2E-RAPP | Q | 0.626 | 0.891 | 0.689 |
| | H | 0.751 | 0.918 | 0.777 |
| | O | 0.744 | 0.914 | 0.752 |

The type H may show superior performance compared to others except for PA2E-DSVDD of the SV dataset. In the case of the type Q, performance may be degraded like PA2E-RAPP since an overlapping portion of windows is present and many latent vectors may be generated by the encoder. Since the overlapping portion of windows is shortest in the type O, a boundary band of the window may be ignored and features may be lost. As a result, when the stride type is H, it shows superior performance compared to other two types. The aggregate autoencoder may include a plurality of layers that influence latent vectors. The aggregate autoencoder may generate a global feature by combining a plurality of local features. The number of layers may be adjusted to demonstrate that abnormal features affect latent vectors.

The window size and the stride size may be set to be the same, as described above. According to an increase in the number of layers of the aggregate autoencoder, it operates in the similar manner as the autoencoder and ignores local features. However, shallow layers may not be sufficient to learn the global feature.

Table 6 shows that AUC depends on a pair of $(N_p, N_a)$. Here, $N_p$ and $N_a$ denote the number of layers of the target partial autoencoder and the number of layers of the aggregate autoencoder, respectively.

TABLE 6

| dataset | $(N_p, N_a)$ | PA2E-MemAE | PA2E-RAPP | PA2EDSVDD |
|---|---|---|---|---|
| IP | (9, 1) | 0.734 | 0.733 | 0.736 |
| | (7, 3) | 0.694 | 0.732 | 0.751 |
| | (5, 5) | 0.665 | 0.731 | 0.617 |
| SV | (9, 1) | 0.885 | 0.834 | 0.906 |
| | (7, 3) | 0.848 | 0.857 | 0.918 |
| | (5, 5) | 0.774 | 0.845 | 0.904 |
| HS | (9, 1) | 0.758 | 0.671 | 0.76 |
| | (7, 3) | 0.75 | 0.709 | 0.777 |
| | (5, 5) | 0.699 | 0.697 | 0.777 |

PA2E-DSVDD shows the highest performance when the number of layers is one due to a model structure that detects abnormality based on a distance between a center point and a latent vector (feature).

There is no need to generate a latent vector including sufficient features to reconstruct input. Therefore, the number of layers of the aggregate encoder may be one in the case of PA2E-DSVDD. Excluding PA2E-MemAE in the IP dataset, PA2E-MemAE and PA2E-RAPP show high performance under condition of (7,3).

It is important to maintain balancing between extracting the global feature for normal features and transmitting abnormal features to the global feature (global latent vector). In the case of PA2E-MemAE in the HS dataset, a pair of (9,1) appears to have lower performance than (7,3). However, in the case of PA2E-RAPP in the IP dataset, (5,5) appears to show lower performance than (7,3). As a result, a pair of (7,3) generally shows high performance and (7,3) is an optimal selection for PA2E-MemAE and PA2E-RAPP.

Due to the partial band, the target partial autoencoder detects local abnormalities. However, since it is not sufficient to generate output different from input, the aggregate autoencoder is connected between the encoder and the decoder of the target partial autoencoder. Herein, fine tuning is used to preserve characteristics of the pretrained preliminary partial autoencoder in the target neural network.

Through experiments related to a case in which components are excluded from the target neural network, importance of each component may be inferred. The size and the number of layers for each of the window and the stride are set to be the same as described above. Table. 7 shows that performance is degraded when the target partial autoencoder is used and fine tuning is not performed.

TABLE 7

| Dataset | Method | DSVDD | MemAE | RAPP |
|---|---|---|---|---|
| IP | AE | 0.647 | 0.709 | 0.632 |
| | PAE | 0.628 | 0.728 | 0.578 |
| | PA2E w/o fine-tuning | 0.712 | 0.731 | 0.734 |
| | PA2E | 0.734 | 0.732 | 0.751 |
| SV | AE | 0.761 | 0.808 | 0.854 |
| | PAE | 0.835 | 0.834 | 0.83 |
| | PA2E w/o fine-tuning | 0.882 | 0.845 | 0.898 |
| | PA2E | 0.885 | 0.857 | 0.918 |
| HS | AE | 0.672 | 0.68 | 0.722 |
| | PAE | 0.697 | 0.692 | 0.616 |
| | PA2E w/o fine-tuning | 0.758 | 0.692 | 0.766 |
| | PA2E | 0.758 | 0.709 | 0.777 |

Although the partial autoencoder detects local features and shows high performance compared to standard AE, there is no dramatic improvement in performance. In the case of RAPP, low results are shown due to dominant global normality. When the aggregate autoencoder is connected between the target partial encoder and the target partial decoder of the target partial autoencoder, such issues may be solved. However, since the aggregate autoencoder disrupts characteristics of the partial aggregate encoder, fine tuning is essential to perverse the characteristics.

Figure 8:
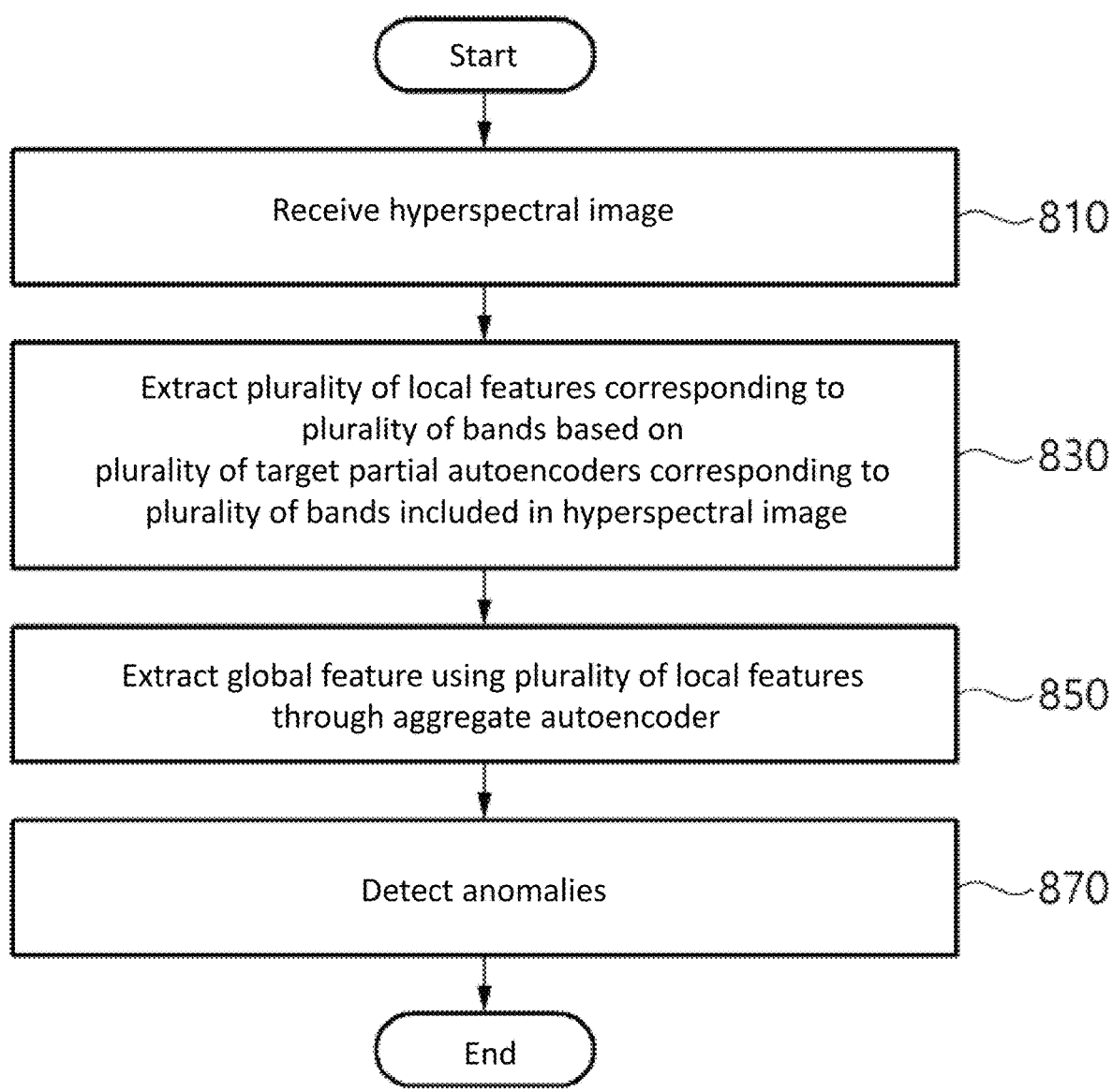
FIG. 8 is a flowchart of an operation of the anomaly detection device of FIG. 1.

FIG. 8 is a flowchart of an operation of the anomaly detection device of FIG. 1.

Referring to FIG. 8, a receiver (e.g., receiver 100 of FIG. 1) may receive a hyperspectral image (810).

The processor 200 may extract a plurality of local features corresponding to a plurality of bands based on a plurality of target partial autoencoders corresponding to the plurality of bands included in the hyperspectral image (830).

The processor 200 may extract a first local feature by inputting a first window corresponding to a first band among the plurality of bands to a first target partial autoencoder. The processor 200 may extract a second local feature by inputting a second window corresponding to a second band among the plurality of bands to a second target partial autoencoder.

The processor 200 may divide the hyperspectral image into a plurality of windows corresponding to the plurality of bands using a sliding window.

The processor 200 may extract a global feature using the plurality of local features through an aggregate autoencoder (850).

The processor 200 may generate an aggregate latent vector by connecting the plurality of local features. The processor 200 may extract the global feature by inputting the aggregate latent vector to an encoder of the aggregate autoencoder.

The processor 200 may generate aggregate output by inputting the global feature to a decoder of the aggregate autoencoder.

The processor 200 may generate a plurality of divided aggregate outputs by dividing the aggregate output. The processor 200 may generate a plurality of restored images by inputting the plurality of divided aggregate outputs to a plurality of target partial decoders of the target partial autoencoder. As described above, the target partial decoder may restore a local band spectrum and the processor 200 may restore an input image through the restored local band spectrum.

The processor 200 may detect anomalies based on the restored image (870). A more specific method of detecting outlier is the same as the method described above with reference to the accompanying drawings.

The processor 200 may train a target neural network for anomaly detection.

The processor 200 may train the preliminary partial autoencoders corresponding to the plurality of bands based on the plurality of bands included in the hyperspectral image. A method of training the preliminary partial autoencoder may be the same as the aforementioned method.

The processor 200 may perform fine tuning on the target neural network based on a weight of the pretrained preliminary partial autoencoder. The target neural network may be in a structure in which the plurality of target partial encoders, the aggregate autoencoder, and the plurality of target partial decoders are sequentially combined. In detail, the processor 200 may perform fine tuning on the plurality of target partial autoencoders based on parameters of the plurality of trained preliminary partial autoencoders. A method of performing fine tuning may be the same as the aforementioned method.

The processor 200 may train the target neural network based on the plurality of bands acquired using the learning data (hyperspectral image) and a loss function computed through results of restoring the plurality of bands through the target neural network. In more detail, the processor 200 may train the target neural network based on the loss function using a difference between input and output of the target neural network.

Example embodiments may improve anomaly detection performance by performing anomaly detection using an autoencoder. Example embodiments may improve anomaly detection performance by dividing the entire band into a plurality of windows and by extracting local features.

The apparatuses described herein may be implemented using hardware components, software components, and/or combination of the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, computer storage medium or device, or in a propagated signal wave to be interpreted by the processing device or to provide instructions or data to the processing device. The software also may be distributed over network coupled computer systems so that the software is stored and executed in a distributed fashion. The software and data may be stored by one or more computer readable storage mediums.

The methods according to the example embodiments may be implemented in the form of program instructions executable through various computer methods and recorded in computer-readable media. Also, the media may include, alone or in combination with the program instructions, data files, data structures, and the like. Program instructions stored in the media may be those specially designed and constructed for the example embodiments, or they may be well-known and available to those having skill in the computer software arts. Examples of the media include magnetic media such as hard disks, floppy disks, and magnetic tapes; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The hardware device may be configured to act as at least one software module for performing operations of example embodiments, or vice versa.

Although the example embodiments are described with reference to some specific example embodiments and accompanying drawings, it will be apparent to one of ordinary skill in the art that various alterations and modifications in form and details may be made in these example embodiments without departing from the description. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. An anomaly detection device comprising:
a receiver configured to receive a hyperspectral image; and
a processor configured to detect outliers in the hyperspectral image based on a pretrained target neural network,
wherein the pretrained target neural network comprising,
a target partial encoder configured to which each window generated from the hyperspectral image is input;
an aggregate autoencoder configured to which each output of the target partial encoder is connected and input;
and a target partial decoder configured to which output of the aggregate autoencoder is divided and input,
wherein the processor is configured to divide the hyperspectral image into the window corresponding to a plurality of bands using a sliding window,
wherein the processor is configured to:
extract a first local feature by inputting a first window corresponding to a first band among the plurality of bands to a first partial autoencoder;
extract a second local feature by inputting a second window corresponding to a second band among the plurality of bands to a second partial autoencoder;
generate an aggregate latent vector by connecting a plurality of local features;
extract a global feature by inputting the aggregate latent vector to an encoder of the aggregate autoencoder;
generate aggregate output by inputting the global feature to a decoder of the aggregate autoencoder;
generate a plurality of divided aggregate outputs by dividing the aggregate output; and
generate a plurality of restored images by inputting the plurality of divided aggregate outputs to the target partial decoder.

* * * * *